United States Patent
Gay

(10) Patent No.: US 11,677,854 B2
(45) Date of Patent: Jun. 13, 2023

(54) CACHED DATA REPURPOSING

(71) Applicant: Home Box Office, Inc., New York, NY (US)

(72) Inventor: Allen Arthur Gay, Shoreline, WA (US)

(73) Assignee: HOME BOX OFFICE, INC., New York, NY (US)

(*) Notice: Subject to any disclaimer, the term of this patent is extended or adjusted under 35 U.S.C. 154(b) by 98 days.

(21) Appl. No.: 17/154,439

(22) Filed: Jan. 21, 2021

(65) Prior Publication Data
US 2021/0144227 A1 May 13, 2021

Related U.S. Application Data

(63) Continuation of application No. 15/167,288, filed on May 27, 2016, now Pat. No. 10,944,842.

(51) Int. Cl.
| | |
|---|---|
| *H04L 67/568* | (2022.01) |
| *H04L 67/60* | (2022.01) |
| *H04L 67/5682* | (2022.01) |

(52) U.S. Cl.
CPC ........ *H04L 67/568* (2022.05); *H04L 67/5682* (2022.05); *H04L 67/60* (2022.05)

(58) Field of Classification Search
CPC .... H04L 67/568; H04L 67/5682; H04L 67/60
See application file for complete search history.

(56) References Cited

U.S. PATENT DOCUMENTS

| | | |
|---|---|---|
| 9,055,124 B1 | 6/2015 | Hill |
| 9,953,052 B1 | 4/2018 | Hill |
| 10,389,736 B2 * | 8/2019 | Dawes ................ H04L 63/1408 |
| 10,944,842 B2 | 3/2021 | Gay |
| 2009/0037366 A1 | 2/2009 | Shankar et al. |

(Continued)

FOREIGN PATENT DOCUMENTS

| | | | | |
|---|---|---|---|---|
| GB | 2540633 A | * | 1/2017 | ............. H04L 67/02 |
| TW | 201222286 A1 | | 6/2012 | |
| WO | WO-2010033150 A1 | * | 3/2010 | ......... G06F 12/0815 |

OTHER PUBLICATIONS

Communication pursuant to Article 94(3) EPC for European Application Serial No. 17732641.0 dated Jun. 19, 2020, 6 pages.

(Continued)

*Primary Examiner* — Kristie D Shingles
(74) *Attorney, Agent, or Firm* — Amin, Turocy & Watson, LLP

(57) ABSTRACT

The described technology is directed towards repurposing expired cached data when no unexpired data is available. Cached, unexpired data is used in response to a request when such data exists. If such data does not exist, e.g., at a front-end data service, then an attempt to obtain the requested data from another (e.g., back-end data service) is made. If the attempt is unsuccessful, and expired cached data exists, the expired cached data is returned in response to the request, e.g., instead of returning an error. A back-end data service may similarly return expired cached data when the back-end data service is unable to obtain unexpired requested data elsewhere. An emergency mode may be entered in which data, whether expired or not, is returned from a cache when such data exists, such as when an attempt to obtain the data elsewhere is known in advance to be futile.

20 Claims, 11 Drawing Sheets

(56) References Cited

U.S. PATENT DOCUMENTS

| | | | |
|---|---|---|---|
| 2009/0043881 A1* | 2/2009 | Alstad | H04L 67/56 709/224 |
| 2009/0083238 A1 | 3/2009 | Chaudhuri et al. | |
| 2010/0100581 A1 | 4/2010 | Landow et al. | |
| 2011/0060881 A1 | 3/2011 | Gallagher | |
| 2011/0202634 A1 | 8/2011 | Kovvali et al. | |
| 2012/0089700 A1* | 4/2012 | Safruti | H04L 67/568 709/217 |
| 2013/0198269 A1 | 8/2013 | Fleischman et al. | |
| 2014/0095804 A1 | 4/2014 | Lientz | |
| 2014/0250169 A1 | 9/2014 | Lowery et al. | |
| 2017/0104838 A1* | 4/2017 | Busayarat | G06T 1/20 |
| 2017/0105049 A1* | 4/2017 | Busayarat | H04L 65/1045 |

OTHER PUBLICATIONS

Communication under Rule 71(3) EPC received for European Application serial No. 17732641.0 dated Feb. 16, 2021, 109 pages.
Office Action for Mexican Application Serial No. MX/a/2018/014627 dated Jul. 8, 2021, 5 pages.
Notice of Allowance for Mexican Application Serial No. MX/a/2018/014627 dated Jan. 20, 2022, 4 pages.
Non Final Office action received for U.S. Appl. No. 15/167,288 dated Jun. 28, 2018, 16 Pages.
Final Office action received for U.S. Appl. No. 15/167,288 dated May 2, 2019, 21 Pages.
Non Final Office action received for U.S. Appl. No. 15/167,288 dated Sep. 18, 2019, 22 Pages.
Final Office action received for U.S. Appl. No. 15/167,288 dated Mar. 27, 2020, 13 Pages.
Final Office action received for U.S. Appl. No. 15/167,288 dated Jul. 6, 2020, 16 Pages.
International Search Report and Written Opinion for International Application Serial No. PCT/US2017/034753 dated Aug. 21, 2017, 11 pages.
Chinese Office Action for Chinese Application Serial No. 201790001055.1 dated Jun. 6, 2019, 3 pages.
Communication pursuant to Article 94(3) EPC for European Application Serial No. 17794554.0 dated Jun. 19, 2020, 8 pages.
Chandramouli, et al., "Query suspend and resume," Proceedings of the ACM Sigmod International Conference on Management of Data, Beijing, China, Jun. 12-14, 2007, Jun. 11, 2007, pp. 557-568, XP055409355.
Goetz, et al., "Pause and Resume—Functionality for index operations," Apr. 11, 2011, Data Engineering Workshops (ICDEW), 2011 27th International Conference, IEEE, pp. 28-33, XP031868603.
Colombian Office Action for Colombian Application No. NC2018/0014241 dated Sep. 25, 2020, 22 pages.
U.S. Appl. No. 15/167,288, filed May 27, 2016.
Supplementary Examination Report received for SG Application Serial No. 11201811664V dated Jul. 14, 2022, 3 pages.
Notice of Eligibility for Grant received for SG Application Serial No. 11201811664V dated Aug. 8, 2022, 1 page.

* cited by examiner

CACHED DATA REPURPOSING

CROSS-REFERENCE TO RELATED APPLICATIONS

This application is a continuation of co-pending U.S. patent application Ser. No. 15/167,288 filed May 27, 2016, entitled "CACHED DATA REPURPOSING." The entirety of the aforementioned application is hereby incorporated by reference herein.

BACKGROUND

Conventional data caches provide a fast way to access data. One typical type of cache uses a hash function related to a request for data to determine a cache location corresponding to the requested data, which facilitates constant time lookup. If the requested data is found in the cache, the data is returned from the cache. If not, (that is, there is a cache miss), the data is retrieved from another source (e.g., a physical data store), returned in response to the request and written into the cache at the appropriate location.

Each data entry in the cache is typically associated with an expiration value, such as a time-to-live or timestamp value. When a request for cached data is received but the data is determined to be expired, the expired data is typically treated as a cache miss, resulting in returning the data from the other source and updating the cache entry with the non-expired data and a new expiration value. At times there are problems with obtaining the data from the other source, however.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards using expired cached data when such expired cached data exists and no unexpired data is otherwise available. Upon receiving a client request for client-requested data, a cache set (one or more caches) is accessed to attempt to locate the client-requested data. If the data is in the cache set and is not expired data, the data is returned from the cache set in response to the client request. If the data is in the cache set and is expired data, the expired data is maintained and the data is requested from a data provider. If the requested data is available from the data provider, the data is received from the data provider and is returned in response to the client request. If the data is not available from the data provider, the expired data is returned in response to the client request Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
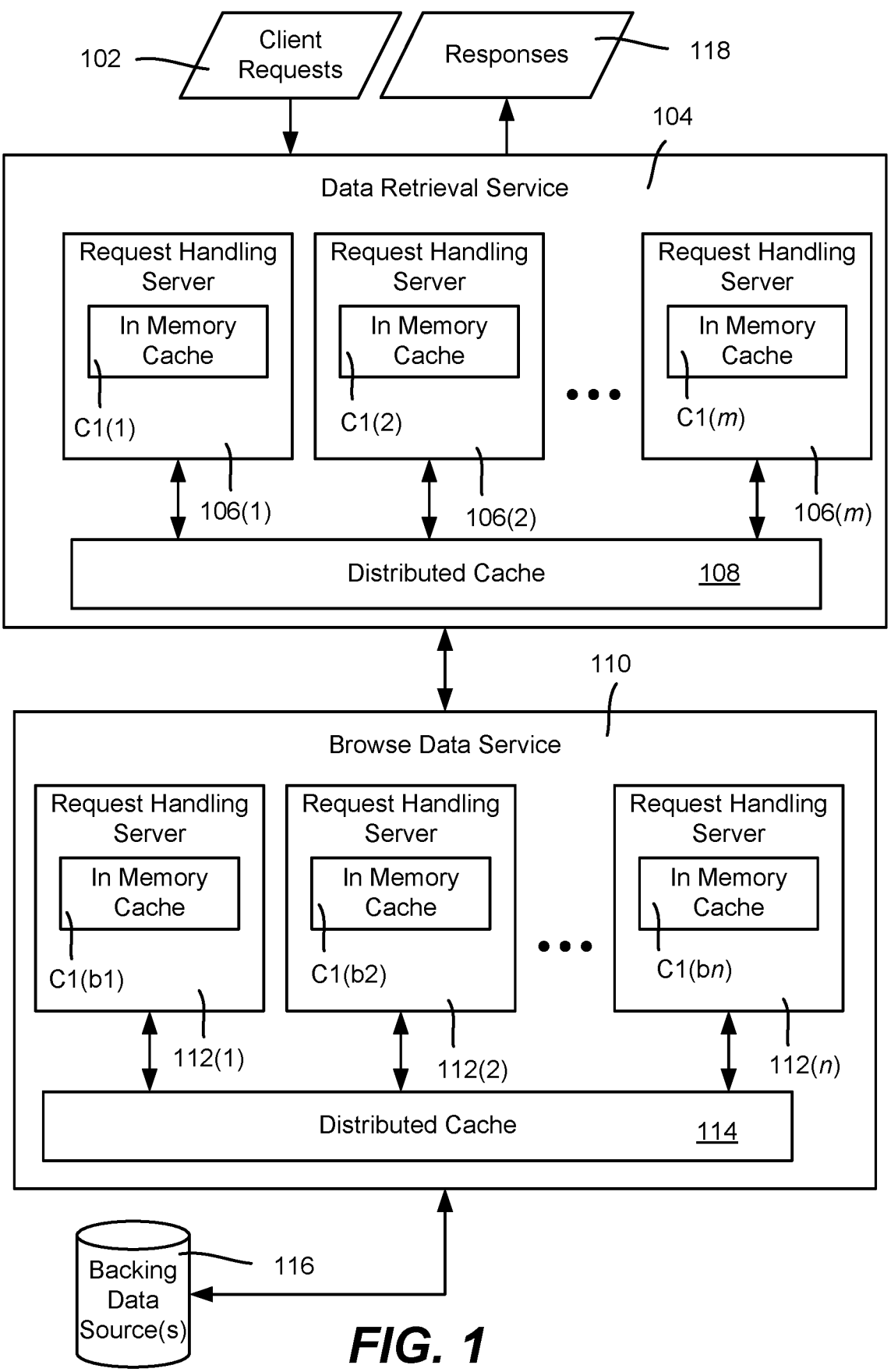
FIG. 1 is a block diagram representing example components that handle requests for data including via caches with possibly expired data, according to one or more example implementations.

Various aspects of the technology described herein are generally directed towards reusing data that is expired when no fresher data is obtainable. In general, the technology operates to avoid returning an error in response to a client request when possible. To this end, one or more aspects are directed towards returning stale data in response to a request rather than an error, such as when an attempt to obtain fresher data fails or is taking an undesirable amount of time. As used herein, requested data is not "available" when a request seeking that data times out (which may or may not be an actual error) and/or fails because of any other error.

In one or more aspects, stale data is not discarded but returned to a requesting entity, typically along with some indication that the data is stale. This may be a conventional timestamp or time-to-live (TTL) value already associated with the cached data, or some other flag. The requesting entity may then attempt to obtain the data from another source, such as another service, physical database or the like. If this attempt fails or takes too long, the requesting entity may return the stale data to the client in response to the original request. As can be readily appreciated, this provides for satisfying client requests in scenarios where stale data is acceptable to an extent, rather than returning errors or taking so long that the client user gets frustrated.

By way of example, consider a client device that is requesting a user's watch-list, comprising a set of items representing television content that the user has specifically identified as desirable for viewing. Items on a watch-list expire, such as when a show on that watch-list is no longer offered to be viewed (e.g., a show may only be offered for viewing for a limited period of time). It is also feasible that a show may be automatically added to a user's watch-list. In the event that the new watch-list cannot be built from a data service servers/databases, such as when a database is down, an expired watch-list from a cache may be returned to the user. Although this watch-list may not accurately reflect what is currently viewable, it is likely preferable to the user to view a somewhat outdated watch-list than to instead receive an error message when requesting his or her watch-list; often, the user may not notice.

Similarly, receiving an outdated watch-list with some expired content is likely more desirable to users than to have to wait several seconds for an updated one. For example, a user may want to watch a show that is currently available for viewing and not even notice that a show appears that is not currently being offered for viewing (actually expired), whereby waiting too long is undesirable and unnecessary. Although there is no way to know what a particular user would prefer to do, a maximum acceptable wait time may be estimated (e.g., empirically determined) for all or most users, or may be user configurable.

It should be understood that any of the examples herein are non-limiting. For instance, some of the examples refer to returning program-related catalog items, such as built from various data sources to represent television content such as movies or shows. However, the technology described herein is independent of any particular type of data being cached. As another example, certain efficiency enhancements are exemplified, such as those related to reducing the total amount of network traffic, but these are only optimizations, not requirements. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and data usage in general.

FIG. 1 is a block diagram representing example components that may be used to provide and work in conjunction with repurposed cached data as described herein. In FIG. 1, client requests 102 are received at a data retrieval service 104, e.g., a front-end client facing service. One such data retrieval service 104 comprises a cluster of generally load-balanced server machines 106(1)-106(m), where m represents any practical number of server (virtual and/or physical) machines. In one or more implementations, the load-balanced server machines 106(1)-106(m) each have an in memory cache, C1(1)-C1(m), respectively.

Also shown in FIG. 1 is a distributed cache 108, e.g., a REDIS cache shared among the request handling servers 106(1)-106(m). In a typical implementation, the distributed cache 108 is larger than the individual in-memory caches C1(1)-C1(m) and has a higher hit rate; however the distributed cache 108 takes longer to access, e.g., needing a network request and response.

Further shown in FIG. 1 is a browse data service 110, (e.g., a back-end service) in conjunction with one or more backing data sources 116. In one or more implementations, the browse data service 110 similarly comprises a cluster of generally load-balanced server machines 112(1)-112(n), where n represents any practical number of such server (virtual and/or physical) machines. In one or more implementations, the load-balanced browse data server machines 112(1)-112(m) each have an in memory cache C1(b1)-C1(bn), respectively (where b stands for browse or back-end to differentiate these caches from those memory caches C1(1)-C1(m) of the request handling servers). A distributed cache 114 likewise is typically provided.

As used herein, the term "cache set" refers to one or more caches within a data service. If there are two or more caches in the cache set, the caches may be arranged in a tiered configuration, with the lowest-level cache (e.g., a server's in-memory cache) accessed first to attempt to locate data; if not found, the next lowest-level cache is accessed next to attempt to locate the data, and so on, up to the highest-level cache until the data is found or no caches remain. Thus, in the example of FIG. 1, the cache set of the data retrieval server 104, from the perspective of any given request handling server (e.g., the server 106(1)), comprises the lowest-level cache (e.g., in-memory cache C1(1)) that server can access, and the distributed cache 108. In the example of FIG. 1, the cache set of the browse data service 110, from the perspective of any given request handling server (e.g., the server 112(2)), comprises the lowest-level cache (e.g., in-memory cache C1(b2)) that server can access and the distributed cache 114. Any practical number of caches may be in a given server's cache set, and the number may be different among services, as well as among different servers of the same service (e.g., one service's server may have two or more in-memory caches, another server of that service a single in-memory cache, and both also may share a distributed cache of the servers' service, and so on).

As described herein, even with various layers of caching, a client request sometimes results in a cache miss or a cache hit of expired data. When this occurs at the request handling server level, the request handling server knows that it needs to build the data, e.g., a data item set of one or more data items, whereby the browse service 110 is invoked. If the browse data service 110 likewise does not have a fresh copy of the requested data in a cache, the browse data service 110 makes requests to the backing data source(s) 116 to obtain the data.

At times, however, such requests to backing data sources fail or take an unacceptable time to complete. In such situations, cached data repurposing logic, operating at either the request handling server level and/or the browse data service level, can return stale data instead of an error or waiting. In any event, the clients get some appropriate responses 118 to the requests 102.

Note that the back-end browse data service 110 may be considered a "data provider" with respect to the front-end data retrieval service 104, as the front-end service makes requests for data to the back-end browse data service 110 and receives data in responses provided by the back-end service. Similarly, the one or more backing data sources 116 may be considered a "data provider" with respect to the back-end browse data service 110, as back-end browse data service 110 makes requests for data to the backing data sources 116 and receives data in responses provided by the one or more backing data sources 116.

Further note that as will be understood, a client request for data actually may correspond to a request for a plurality of data items that are built into a response to the client; (it is also possible to return individual data items for the client to build into a "response"). Similarly a request from the front-end service to the back-end service may comprise a single data item request or request(s) for a plurality of data items; this is also similar with respect to for request(s) from the back end data service to the one or more backing data sources and the corresponding response(s). For purposes of brevity, a request for data and corresponding data response between any two entities can be considered herein to include such "sub-requests" for data items and "sub-responses" that are returned, (as well as to include single data item request/single response operations). This terminology may be applied herein regardless of whether and how a single request or batched request may or may not be divided into separate sub-requests, and/or regardless of how a response may be built (at any level) from separate sub-responses of data items. Notwithstanding, one or more examples of a request that corresponds to a plurality of data items are described herein.

Figure 2:
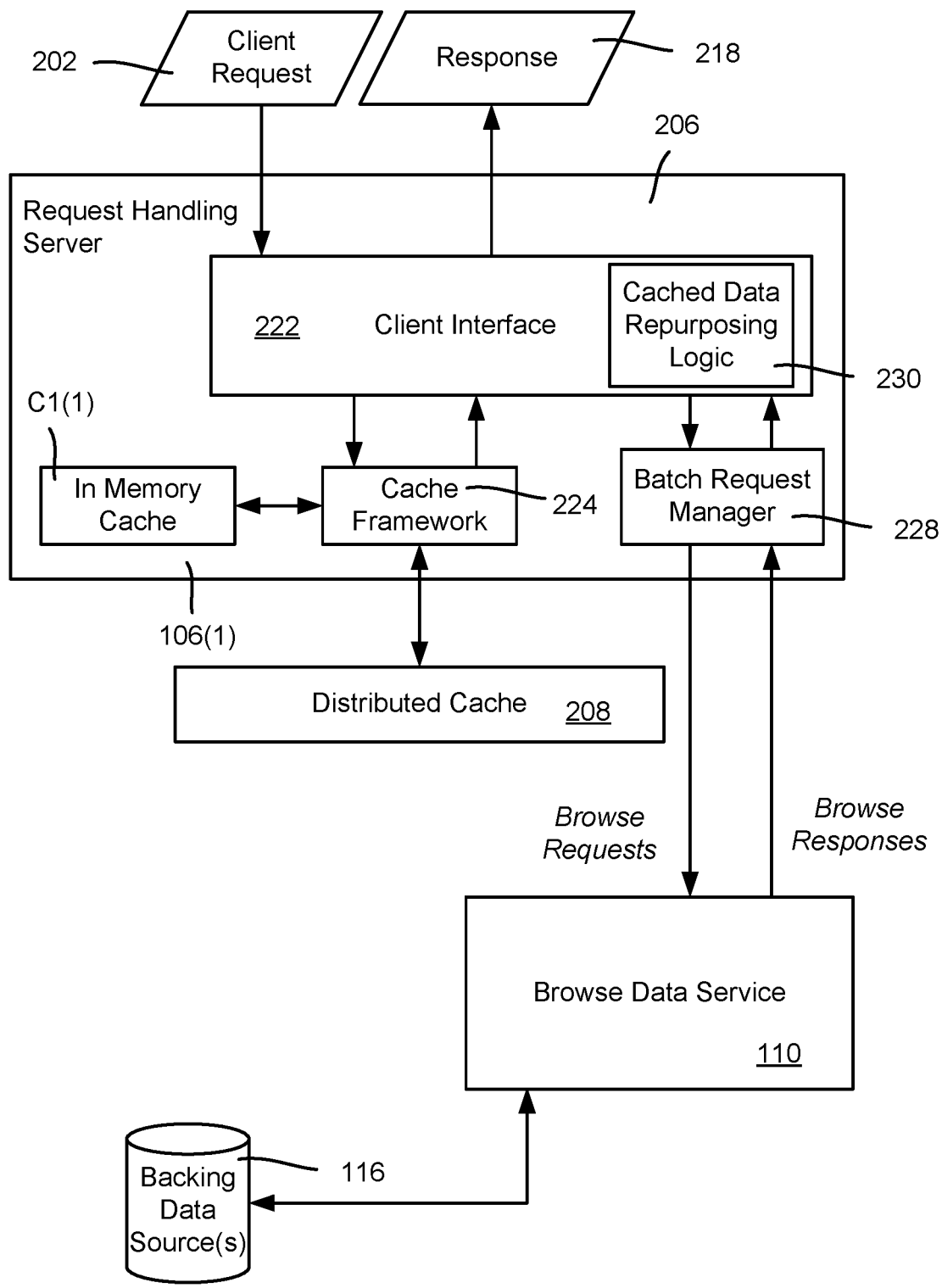
FIG. 2 is a block diagram representing example components of a front-end request handling server that may return repurposed (expired) data in a response to a request when no unexpired data is available, according to one or more example implementations.

FIG. 2 shows additional details of a client request handling (front-end) server 206. In one or more implementations, a client request 202 is received at a client interface 222 of the request handling server 206. For caching purposes, the exemplified implementation includes a cache framework 224 that accesses each cache as needed an attempt to find the requested data, starting with the lowest level cache, in-memory cache C1(1); (the concept of "lower-level" and "higher-level" with respect to caches as used herein is somewhat similar to CPU caches in which the L1 cache is considered a lower-level cache than the L2 cache, and so on, with L1 checked before L2, and so on). If not found, the cache framework 224 looks to the distributed cache 208 for the data; (note that in or more implementations the caches may be accessed with a batch request for items, with the lower-level cache accessed first to look for each item of the batch of items, and for any misses at the lower level, those missed items looked for in the higher-level cache next, and so on). If again not found, the cache framework 224 returns a cache miss, which indicates that the request handling server 206 needs to obtain the data from the browse data service 110.

As described below, a request manager 228 may manage the requesting of such data, including batching requests and/or multiplexing requests (e.g., sending duplicated requests only once, instead of individual requests, and then reuniting the single response thereto with each of the individual requests) to avoid overloading the browse data service 110.

As described herein, the request handling server 206 may similarly request data from the browse data service 110 when cached data is found, but is expired in the in memory cache C1(1) and the distributed cache 208. However, when expired data is found, the cache framework 224 may return the expired data with some indication that the data is expired. This allows the request handling server 206 to use the expired data as desired if the browse data service 110 is unable to return the requested data. As shown in FIG. 2, cached data repurposing logic 230 is provided for dealing with expired data. Note that the cached data repurposing logic 230 is represented in FIG. 2 as part of the client interface 222, but may be a separate component. Indeed, in any of the figures, it is understood that the represented components are only examples, and that at least some components may be combined and/or components further separated into more components.

Figure 3:
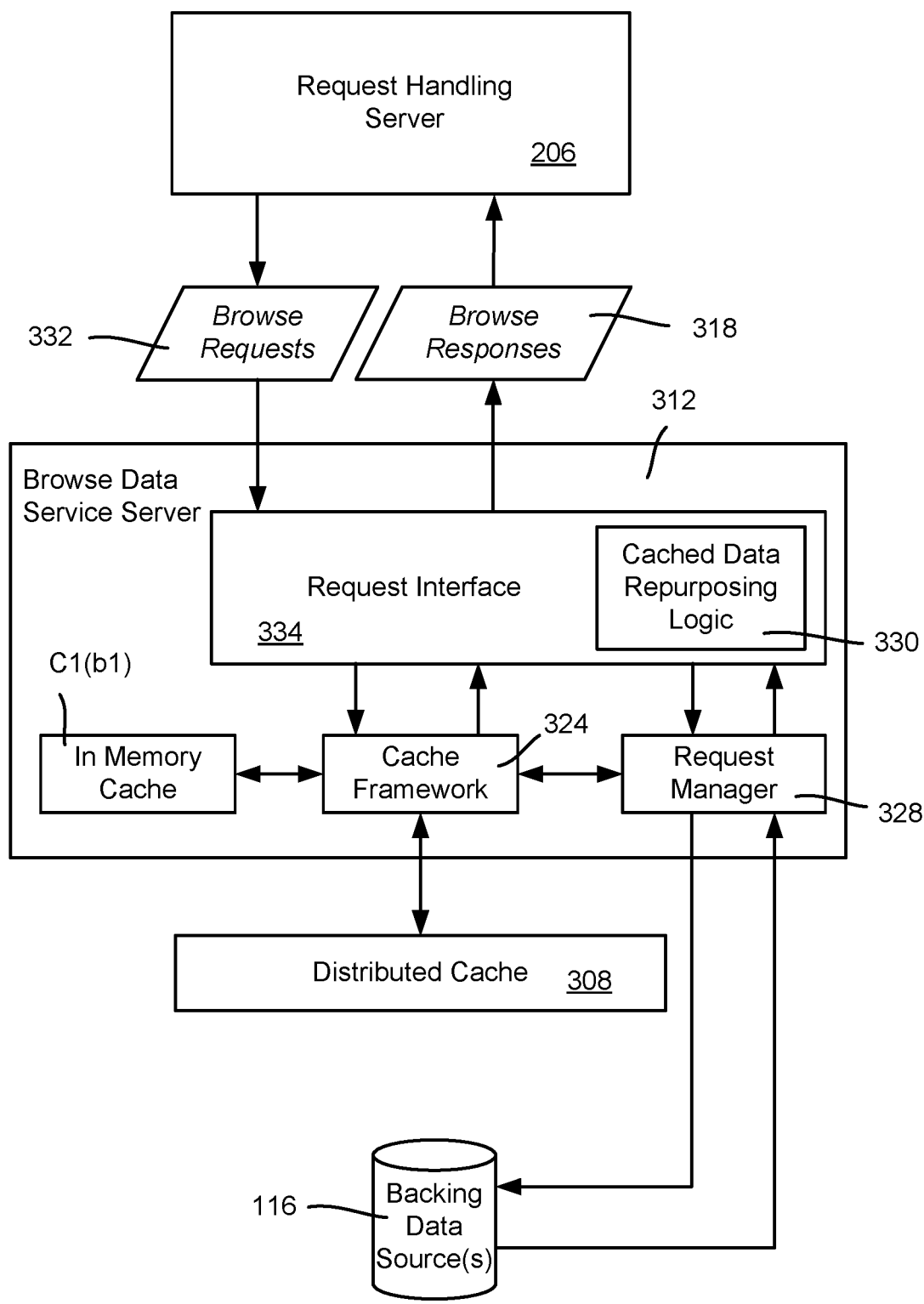
FIG. 3 is a block diagram representing example components of a back-end browse data service server that may return repurposed data in a response to a request when no unexpired data is available, according to one or more example implementations.

FIG. 3 shows additional details of a browse data service server 312 that handles browse data requests 332 from a request handling server 206. The exemplified browse data service server 312 is generally similar to the request handling server 206 of FIG. 2, however the cache framework 324 may not return a cache miss. Instead, if requested data is not cached, or is cached but expired, the cache framework 324 or other component of the server 312, e.g. via a request manager 328, makes a request to the backing data source or sources 116 to obtain the requested data. The data is either returned, or an error is returned.

Note that the request manager 328 may batch requests, and/or also may multiplex requests as described herein, (although in implementations in which the front-end service multiplexes requests, multiplexing requests at the back-end service may not provide benefits, as only non-duplicated requests need to be handled). However, in alternative implementations in which duplicated requests may need to be handled at the back-end, back-end request multiplexing may be performed.

Figure 4:
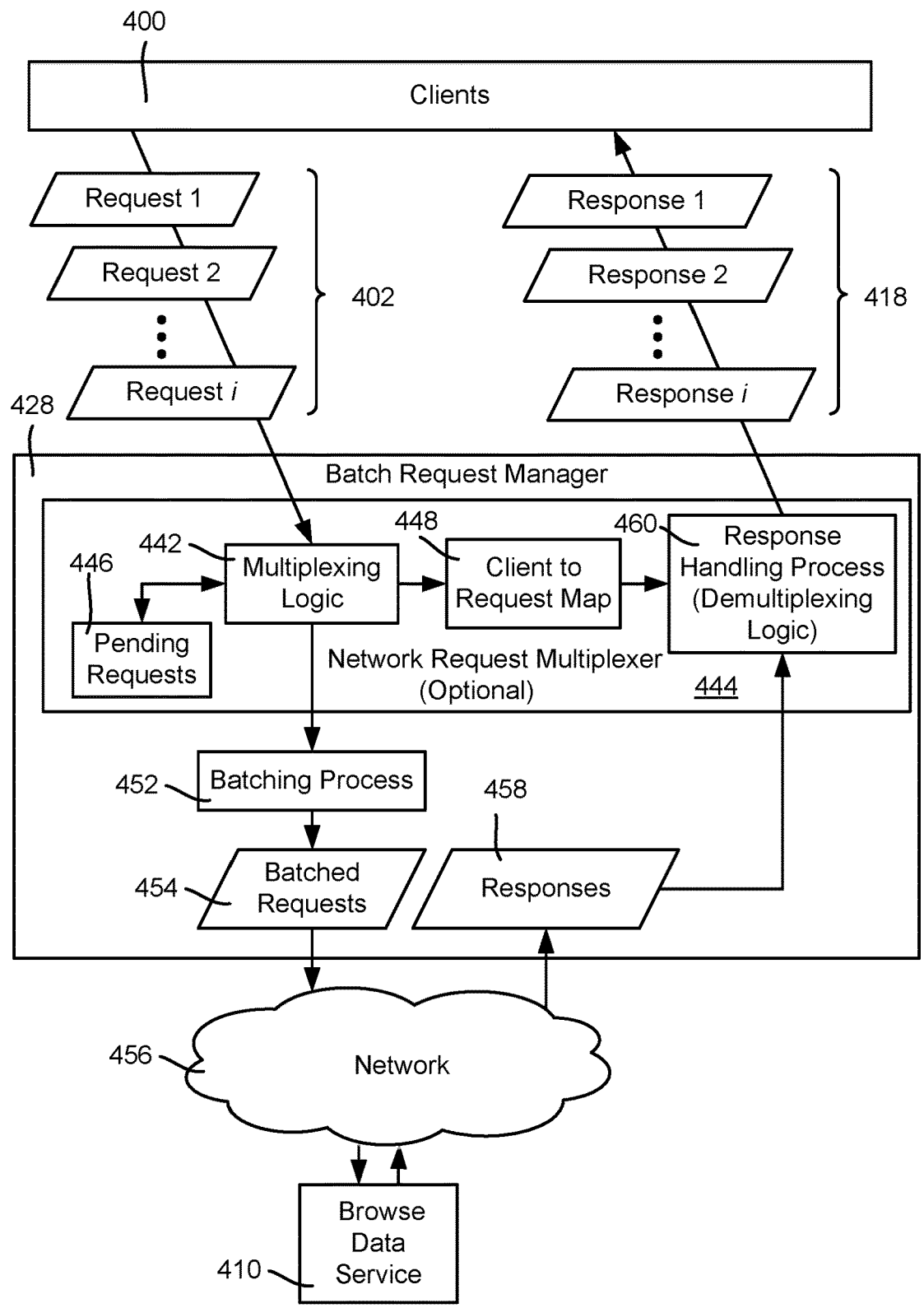
FIGS. 4 and 5 are block diagrams representing example components of batch request managers, one of a front-end server (FIG. 4) and another of a back-end server (FIG. 5) that each may batch and/or multiplex requests for data, according to one or more example implementations.

FIG. 4 shows additional details of an example batch request manager 428, (which generally also applies to the request manager 328). In general, requests 402 (request 1-request j) that were not satisfied from a cache at the request handling server level come in to the batch request manager 428 from requesting clients 400. Each request is associated with some client identifier, whereby responses 418 (response 1-response j) are returned for each request 402 (request 1-request j) based upon which client made which request.

The batch request manager 428 is provided for efficiency, namely to handle such requests and responses in a way that reduces the load upon the browse data service 410. As described herein, in one or more implementations, efficiency is obtained by batching requests and multiplexing requests, (although neither batching nor multiplexing is a requirement, and each may operate without the other).

Batching generally is directed towards combining multiple requests into a single batch request instead of making individual requests, which is generally more efficient. To this end, batching collects requests for some amount time, e.g., corresponding to a rendering frame, and then sends a batch request when the time is reached. The number of requests in a batch may be limited, e.g., to sixteen or thirty-two, and thus to handle a larger number of requests, multiple batch requests may be sent per time window, e.g., generally at the same time, but may alternatively as soon as a batch is full.

Multiplexing generally refers to making a request for the same data only once, basically filtering out duplicates. As described herein, multiplexing may be done by tracking pending requests, and only making a request if not pending. A pending request may be considered one that has been previously made and not yet received a response, including one that has been already added to a batch waiting to be sent (if batching is being performed). As can be readily appreciated, because a multiplexed request results in a single response that has to be sent back to multiple, different requestors, some tracking needs to be done so that a multiplexed request may be mapped back to its initiating requestor.

By way of example, consider that among the many requests handled by a given request handling server, five different clients have made requests that either are in a cache miss or expired cache data condition, which causes a need to have the browse data service invoked. Thus, the batch request manager 428 multiplexes and/or batches these five requests. As part of multiplexing, the batch request manager 428 needs to have a mapping mechanism that maintains a relationship between which request corresponds to which client or clients.

As a more particular example, consider that both client A and client B have requested some data item XYZ. The multiplexer recognizes this, and only makes a single request for data item XYZ. However, when the single response comes back with the data of data item XYZ, the mapping mechanism (which may be considered a "demultiplexer") recognizes that this item applies to two different client requests, and thus that client A needs its own response with data item XYZ, as does client B. A response is thus sent for each request.

Thus, in the example implementation of FIG. 4, multiplexing logic 442 receives the requests 402, and for each request, maps a client identifier to the requested data item in a suitable data structure 448. For each request the multiplexing logic also checks a set of pending requests 446, to determine whether a request for that data item is already pending. If so, the data item is not requested again, otherwise the request is provided to a batching process 452.

The batching process collects such requests, and sends a set of one or more batched requests 454 to the browse data service 410, e.g., over a connection of network 456. The browse data service 410 returns a response for each request, shown as responses 458.

The responses 458 are typically not returned as a similar batch, and may contain data items as well as error codes. Indeed, waiting for a full set of responses to a batch request may delay all responses to the slowest one (which may be a long time), and is thus undesirable. Notwithstanding, batched responses are feasible to use, and subsets (sub-batches) of responses to a batch may be returned.

As described herein, a response may corresponds to multiple requestors, and thus a response handling process 460 (basically demultiplexing logic) uses the client to request map 448 to provide a response for each request. Note that a response may be an error message, in which event the cached data repurposing logic 330 (FIG. 3) may decide to use expired data, if available, rather than return an error response.

Figure 5:
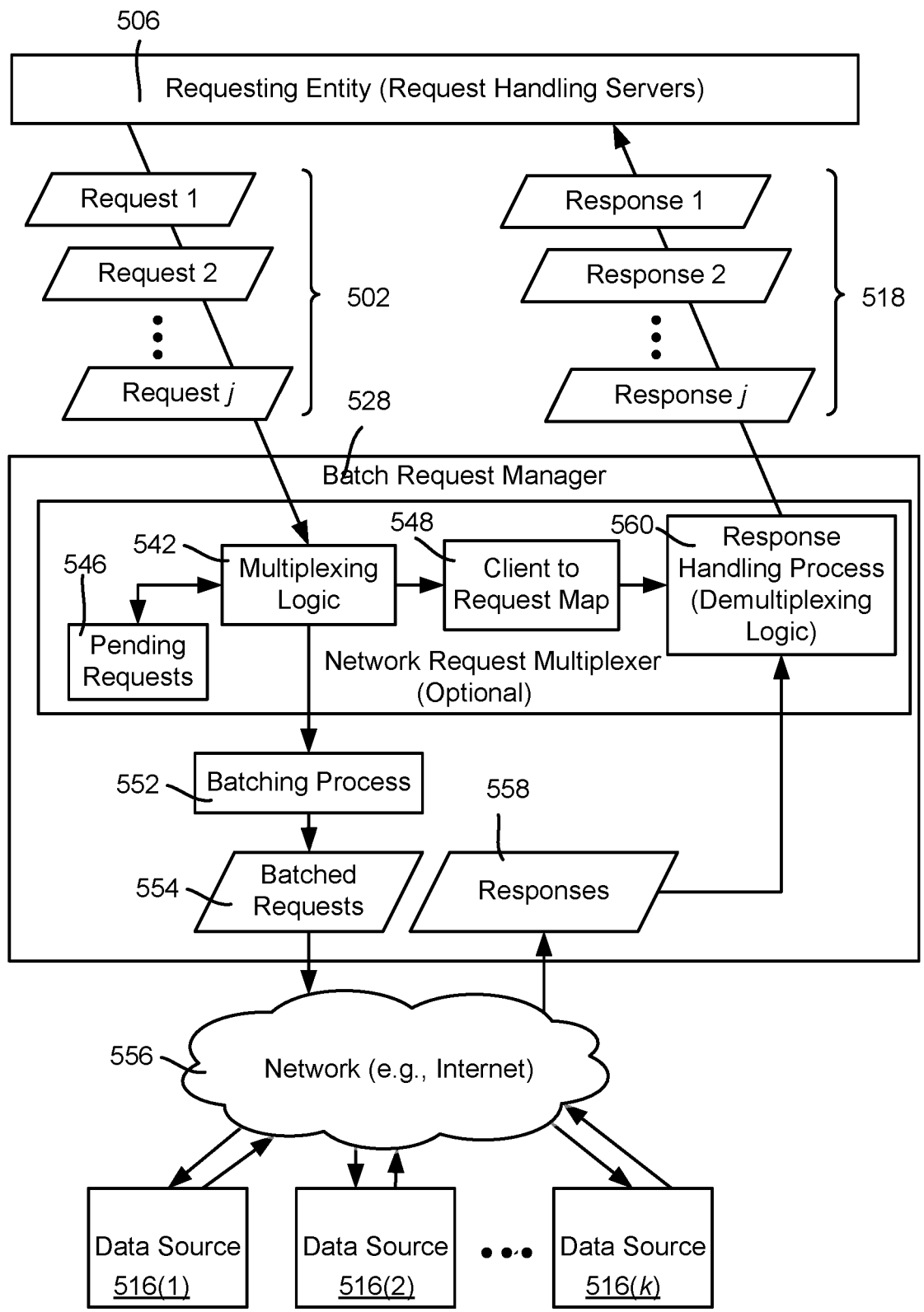

FIG. 5 is similar to FIG. 4 with respect to optional multiplexing and batching requests, and is generally not described again except to note that the requesting entity 506 may be one or more data handling servers that send requests to the browse data service, and also that multiplexing may not provide much if any benefit if front-end multiplexing eliminates or substantially eliminates duplicate requests. Further, the batch request manager 528 may make internet requests to different data sources 516(1)-516(k), and thus batching may not be always available.

Figure 6:
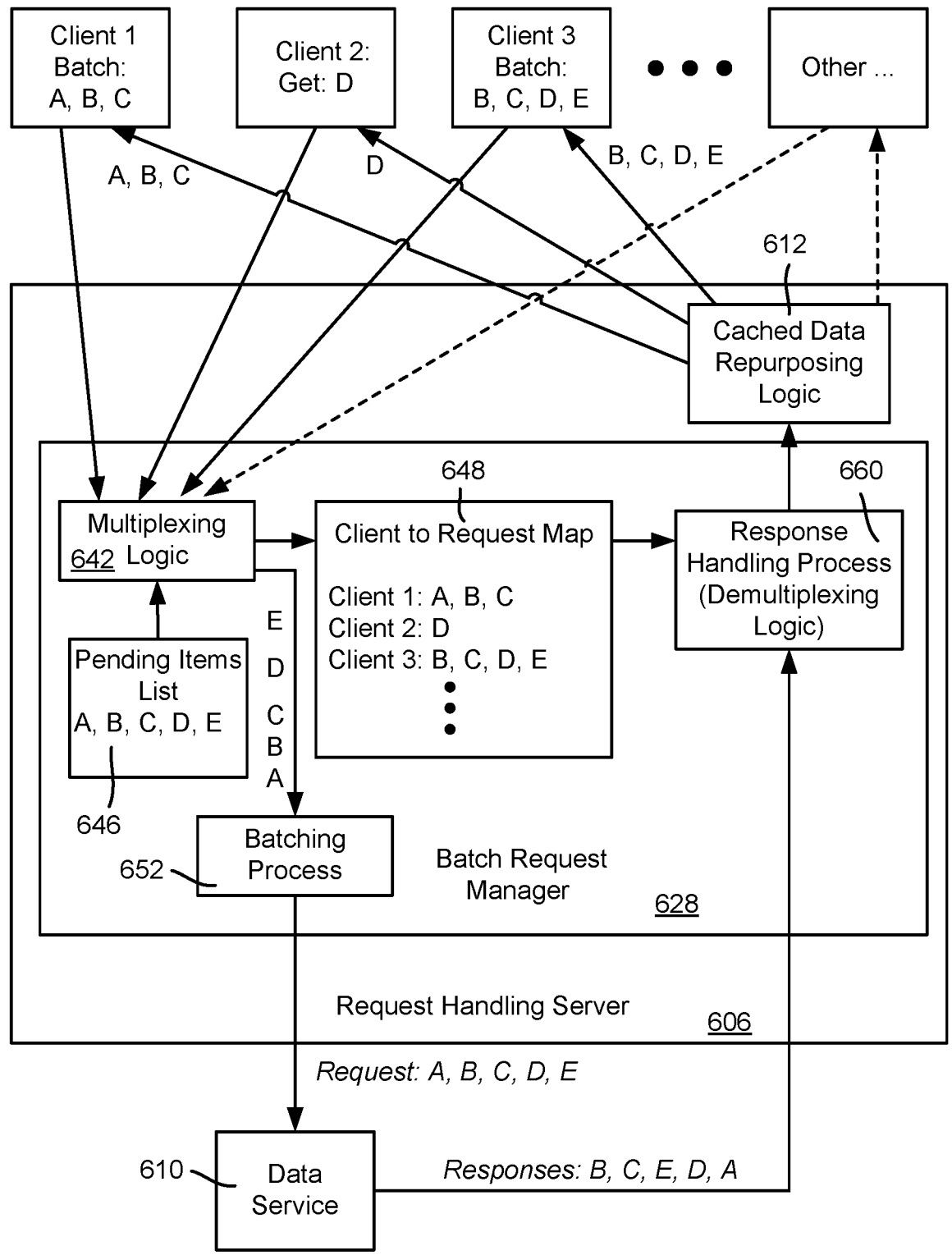
FIG. 6 is a representation of batching and multiplexing data requests (and demultiplexing responses), according to one or more example implementations.

FIG. 6 shows an example of a batch request manager 628 with requests for data items (A)-(E) made by various clients. In FIG. 6, client 602(1) makes a batch request for data items (A), (B) and (C), client 602(2) makes a get request for item D, and client 602(3) makes a batch request for data items (B), (C), (D) and (E). There may be other requests as well, represents by block 602(x), however for purposes of this example consider that only clients 602(1)-602(3) are making requests within this timeframe.

The requests come into the multiplexing logic 642 of the batch request manager 628. As the requests are received, the multiplexing logic updates the client to request map 648. Further, duplicate requests are removed by checking the pending items list 646 and adding only one instance of each request to the list 646 and sending only one request to the batching process 652.

At the appropriate time, e.g., once per video rendering frame, the batching process sends a batch request for items (A), (B), (C), (D) and (E) to the browse data service 610. The browse data service 610 returns data from one of its caches when cached, or attempts to obtain the data from one or more data stores if not cached. Again, cached but expired data may be returned instead of an error, if such data exists. Note that the responses are not batched in this example, and may be returned in any order, e.g., responses for data items (B), (C), (E), (D) and (A) are returned in the example of FIG. 6.

Any of these data items may be an error response rather than the actual data item. Because all the way data items are built and cached, they are not independent of one another in one or more implementations. In such implementations, an error message with respect to any one of a group of data items requested together may cause the entire request to fail. If available, expired data may be returned instead of a failure message, with some indication that the data is expired.

As described herein, these responses, which were multiplexed, need to be mapped back to their requesting clients. This is performed by the response handling process 660, using the map 648 to build a response for each client. Note that a response to each client may not be batched, but returned as received, basically in a "stream" of responses. Further, as described herein, cached data repurposing logic 612 may decide to use expired data rather than an error message for any error returned in a response.

Figure 7:
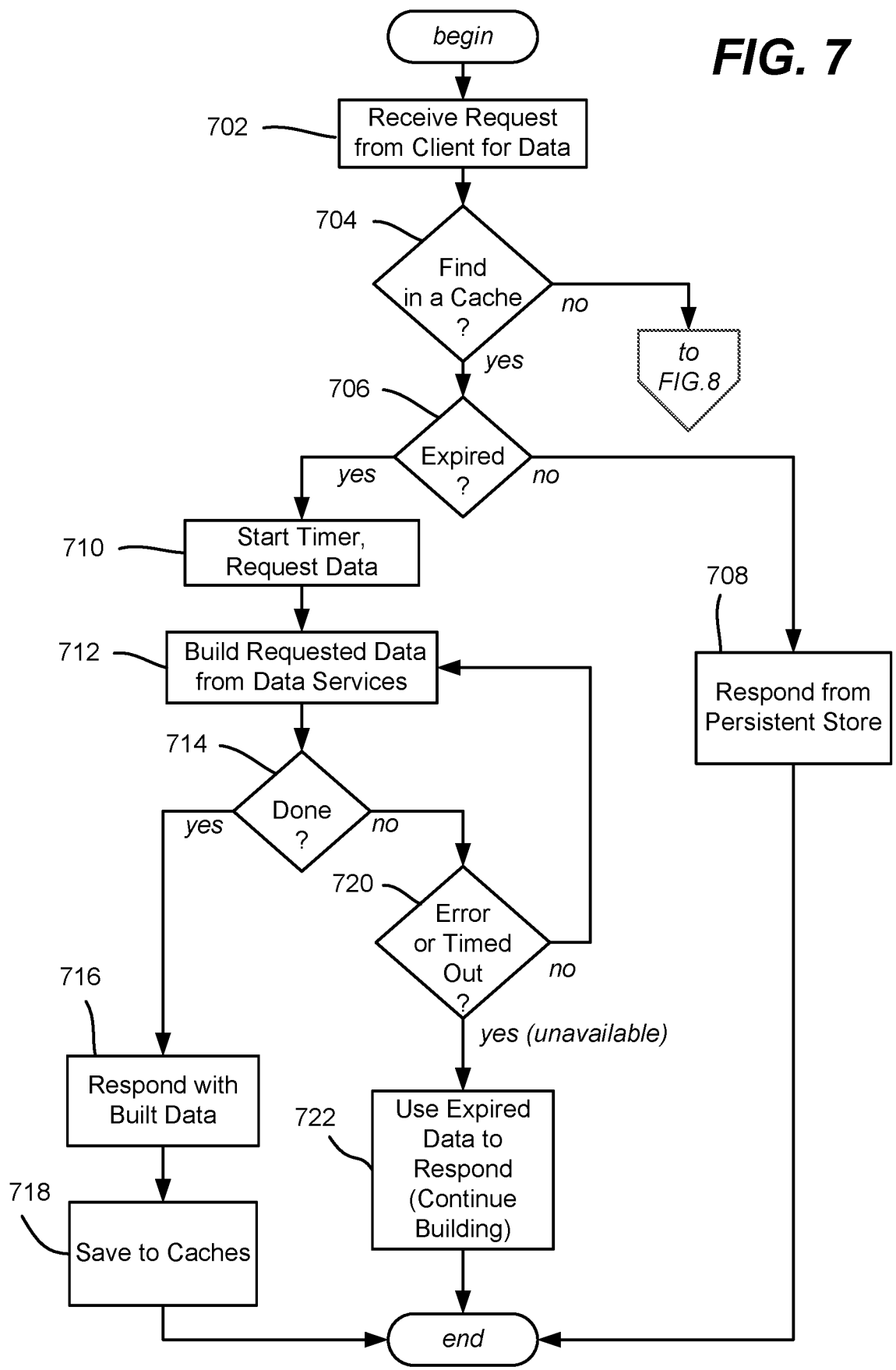
FIGS. 7 and 8 comprise a flow diagram showing example logic/steps that may be performed to return data in response to a request, including repurposed data when unexpired data is not available, according to one or more example implementations.

FIG. 7 is a flow diagram showing example steps that may be taken by cached data repurposing logic of a request handling server (e.g. 106 (1) of FIG. 1) of the data retrieval service 104 (FIG. 1). Step 702 represents receiving a request from a client for data. Step 704 evaluates whether the data is found in a cache of the data retrieval service level. If not, step 704 branches to FIG. 8 (described below) to request the data from the browse data service.

If found in a cache, step 706 evaluates whether the data is expired. Note that if the data was found in the in memory cache, and was expired, the cache framework also looks to the distributed cache to see if unexpired data is present. Unexpired data is used when available. If not expired at step 706, step 708 returns the cached, unexpired data in a client response.

If expired, the data may be available from the back-end browse data service. However, the time it takes to obtain the data may be undesirable, and thus step 710 represents starting a timer so that the amount of time can be evaluated, as well as making the request(s) to the back-end data service. Step 712 represents building the requested data from the data services, e.g., as the requested data comes in. Note that the request for data may correspond to multiple data items requested in a batch request, or possibly via separate requests.

The building continues at step 712 as data items are received from the browse data service until done as evaluated at step 714, or an error or timeout occurs as evaluated at step 720. If the building of the response is done successfully, step 716 responds with the data. Step 718 saves the data to the caches via the cache framework.

If the data is unavailable whether because an error is returned or the building operation times out as evaluated at step 720, the expired data is returned instead of an error message at step 722. For a timeout situation, although expired data was returned to one or more requesting clients, the request handling server will continue to build the data (e.g., for anticipated future requests), and will cache the data if successfully built. If an error is returned, the request handling server may attempt to re-request the data, although this may depend upon the type of error.

As described herein, the browse data service also may be configured to return expired data instead of an error message, in which event the request handling server may choose to use that expired data. Indeed, the expired data from the browse data service back-end level maybe fresher than the expired data from the caches at the data retrieval service front-end level, and the expiration times, if different, may be used to decide which set of expired data to use.

Figure 8:
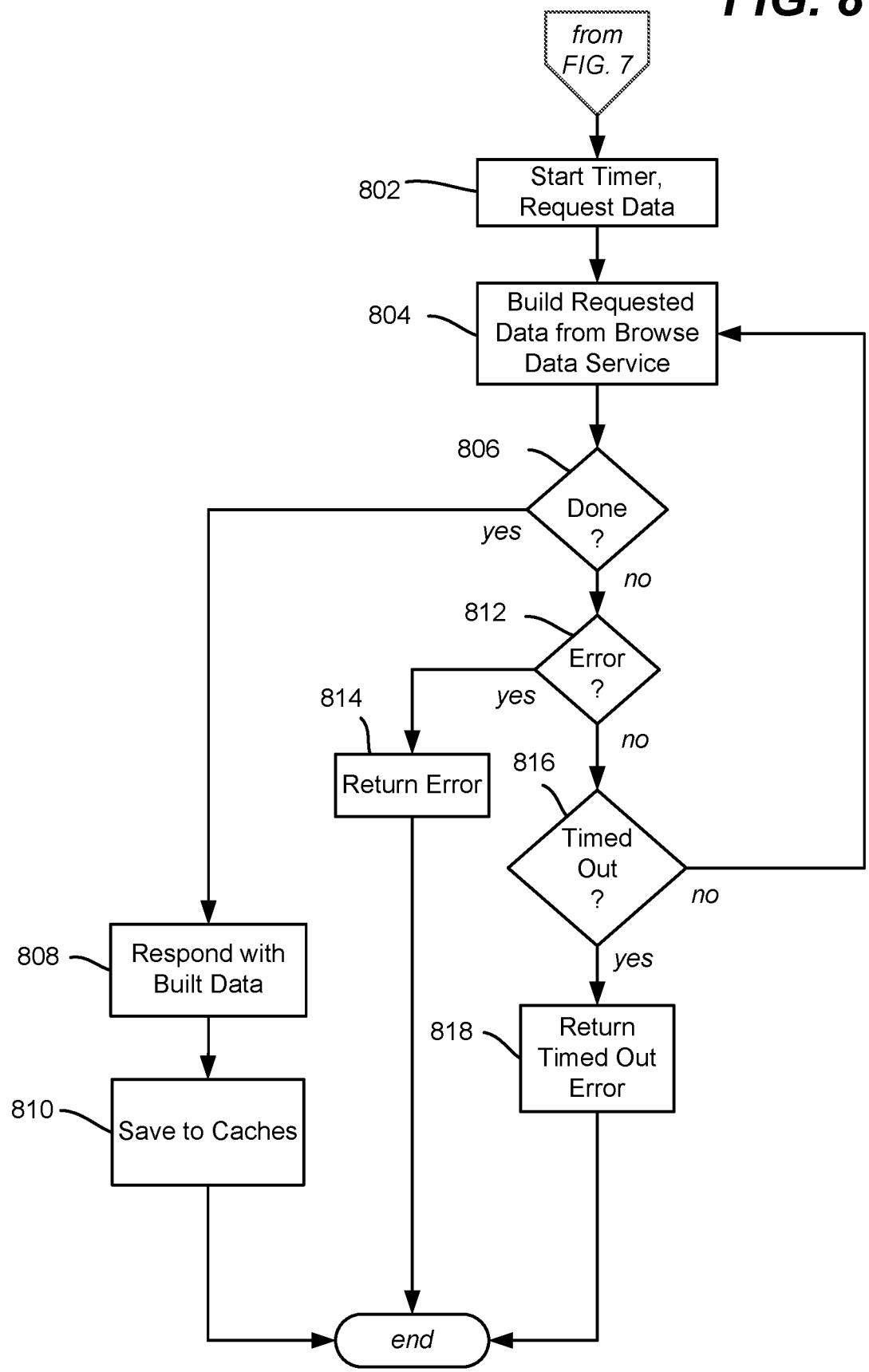

FIG. 8 represents calling the browse data service when no cache data including any expired data was found by the request handling server (e.g., its cache framework). As can be readily appreciated, a difference of FIG. 8 from step 710's branch is that there is not any expired data to potentially use, in which event the data that satisfies the request needs to be built or an error returned.

Step 802 starts a timeout timer, which may be a different amount of timeout time from that with reference to steps 710 and 720 of FIG. 7. For example, it may be more desirable to wait longer when there is no expired data available at the front-end, as opposed to returning expired data when available at the front-end. Step 802 also represents making the request(s) to the back-end data service Step 804 represents building the requested data as data items are received from the browse data service, which continues until done as evaluated at step 806, an error is detected at step 812 or the timer reaches the timeout time at step 816. If done successfully, step 808 responds with the built data, and step 810 saves it to the caches, e.g. via the cache framework. Note that the data returned from the browse data service may be expired data from a cache at the browse data service level.

If an error is detected at step 812 while receiving the data items for building the response, then in one or more implementations an error needs to be returned in the response. If a timeout occurs as evaluated at step 816, then an error also needs to be returned, however the timeout error message may be different from the error message for an error. Note that the timeout time may be longer than the time that the browse data service uses to return expired data if retrieving the data from the data sources is taking too long.

Figure 9:
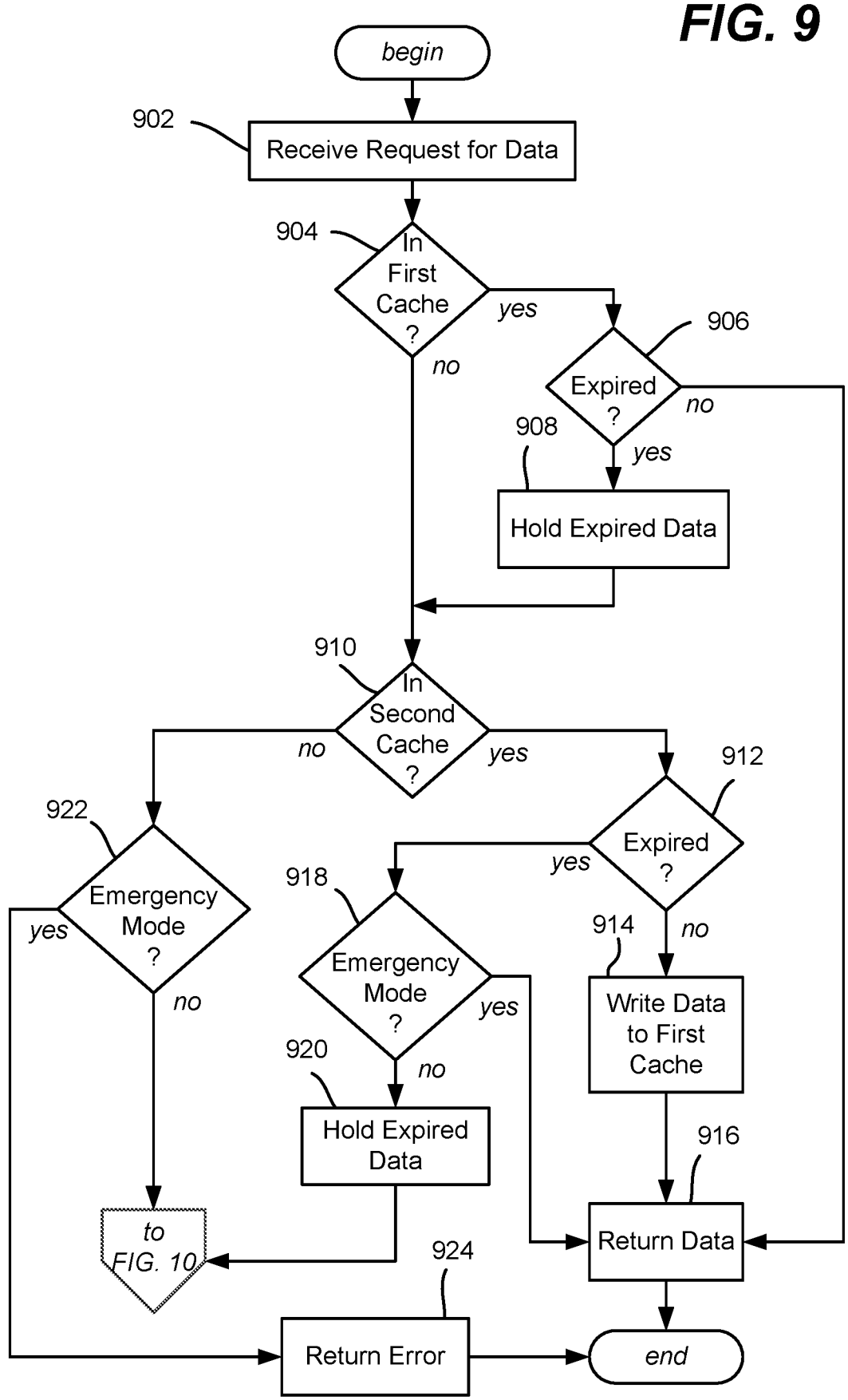
FIGS. 9 and 10 comprise a flow diagram showing example logic/steps that may be performed to return data in response to a request from a front end service, including repurposed data when unexpired data is not available, according to one or more example implementations.
Figure 10:
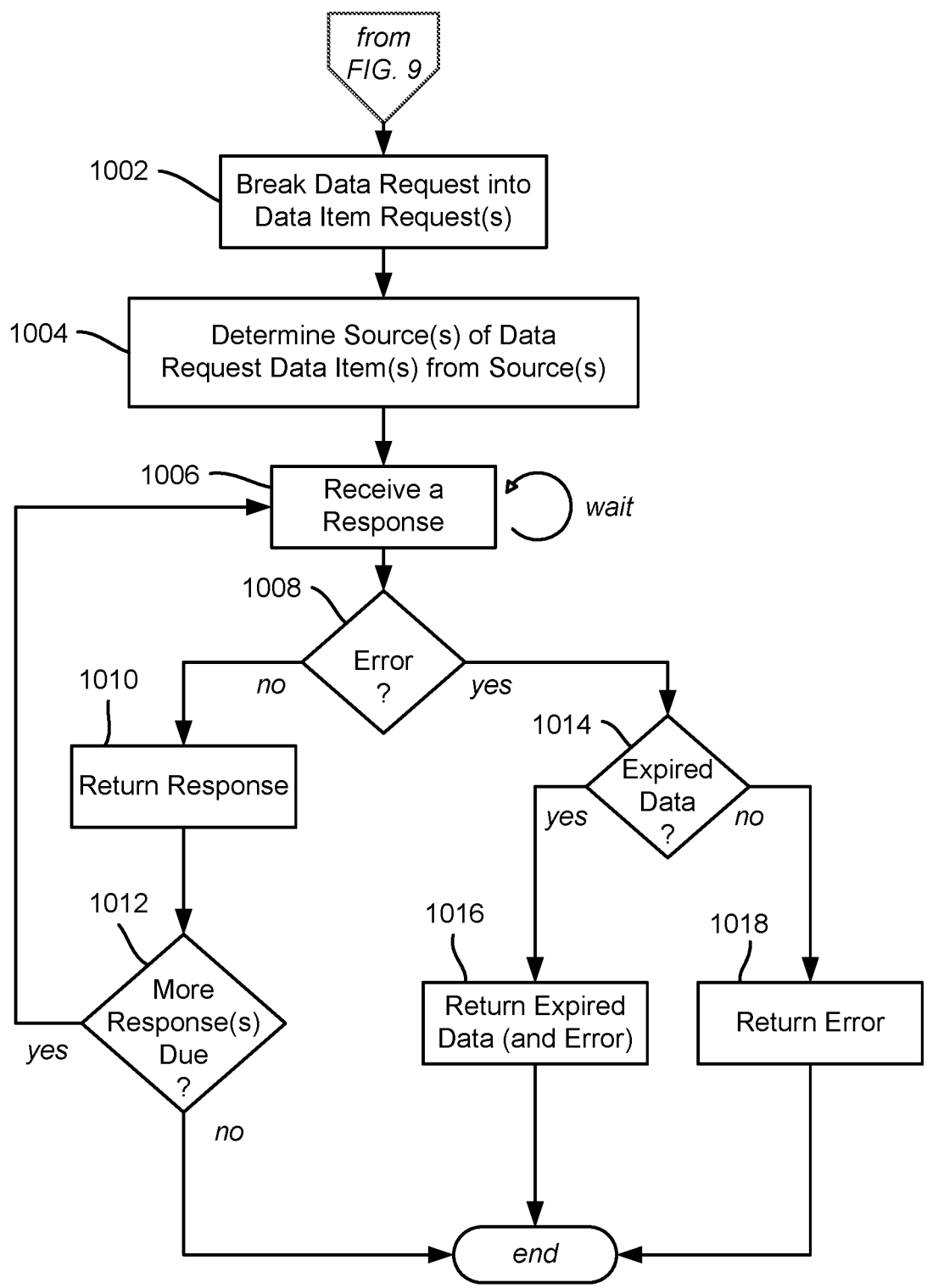

FIGS. 9 and 10 are directed to operations performed by the browse data service upon receiving a request for data. As described herein, the browse data service also maintains caches for responding to requests. Note that FIG. 9 assumes a first level and second level cache, however (as with the front-end service) there may be no caches, one cache or up to any practical number of caches at the browse data service level.

Thus, upon receiving a request at step 902, step 904 evaluates whether the request may be satisfied by data in the first cache. If so, step 904 branches to step 906 which checks whether the data is expired. If not, step 906 branches to step 916 where the data is returned for this request. If found at step 904 but expired at step 906, step 908 holds the expired data. This allows the expired data to be returned if the data item(s) comprising the request are unable to be retrieved from the data source(s). Note that step 908 may be bypassed if it is certain that this same data or a fresher copy of this data is in the second cache.

If not found in the first cache or found but expired, step 910 looks for the data in the second cache. If found in the second cache, step 912 similarly is performed to determine whether the data is expired. If not, the data it found in the second cache is used to update the first cache at step 914, and step 916 returns the data.

It should be noted that an emergency mode may be used when it is known that the browse data service will be unable to return a requested data item from a data source. For example, if it is known that a significant backing data source is down, then making the request to that backing data source is pointless. This may be detected by a flood of error messages, for example, which may be used to automatically turn the emergency mode on, or the emergency mode may be manually turned on by an administrator or the like. It is also feasible to notify the front-end service of the emergency mode and let the front-end data service use any cached, expired data directly, although this means that expired data is returned even when the back-end data service has non-expired cached data. Still further, if the front-end data service is unable to communicate with the back-end data service, the front-end data service may operate in its own, similar emergency mode in which expired data is returned without attempting to obtain data from the back-end data service.

In general, when in the emergency mode, if cached, the requested data is returned from a cache, whether expired or not. For example, if expired, the data from the second cache (which is ordinarily the same or fresher) is returned rather than expired data from the first cache, (however it is feasible to simply use expired data from the first cache while in emergency mode without even accessing the second cache, provided such data exists).

Thus, if found but expired, step 918 determines whether the service is in the emergency mode, and if so step 916 returns the expired data. If not in the emergency mode then step 920 holds the expired data. Note that the expired data from the second cache may overwrite any previously held expired data from the first cache, as data in the second cache is (normally) fresher than or the same as data in the first cache. If this is not certain, however, the fresher of the two may be used, for example, which is one reason why step 908 may be used to hold the data.

If no data is cached as determined by step 910, and in the emergency mode as determined at step 922, then an error is returned at step 924. Note that this assumes that the second cache includes any data that exists in the first cache, (because the second cache is ordinarily larger and write through operations occur to each cache and so on). If this is not certain, then instead of directly returning an error, a check (not shown in FIG. 9) may be first made as to whether expired data is being held (via step 908) from the first cache, and if so, that held data is returned instead of the error at step 924.

If not in the emergency mode, and if no data is cached or only expired data was cached, the steps continue to FIG. 10 to retrieve the data item or items corresponding to the request.

Step 1002 of FIG. 10 represents breaking the data requests into one or more data item requests. Step 1004 determines the source for each data item request and sends a request to the source corresponding to the data item. For example, the browse data service knows from which data source to request images for an image data item, text for a movie description, and so on, and any of these may be different data sources. Requests to the same data source may be batched; it is also feasible to batch requests to different data sources in a batch request if a downstream entity is present that can separate the individual requests.

Step 1006 waits for a response to be received. When received, step 1008 evaluates whether the response is an error message. If not, step 1010 returns the response. Step 1012 evaluates whether more responses are due, that is, whether one or more requests for data items are still outstanding. If so, step 1012 returns to step 1006 to wait for the next response, otherwise the data items have all been returned and the process completes.

If an error was received at step 1008, then no complete response may be returned in one or more implementations. Note however that alternative implementations may allow individual data items to be returned and used in a partial response, possibly combined with expired data to provide a full response.

Because in this example an error in retrieving any data item means that the entire request failed, step 1014 attempts to return expired data instead, that is, if expired data exists (e.g., held at step 908 or step 914 of FIG. 9). If expired data exists, step 1016 returns the expired data, possibly along with an error message or other error code to provide the data retrieval service with more context as to why expired data was returned. For example, a timeout error may be returned, in which event the data retrieval service may re-request the data, whereas a message indicating that no such data exists (e.g., the requested data item has been removed from a database) may not be re-requested. If an error is returned as detected at step 1008 and no expired data exists as evaluated at step 1014, then step 1018 returns an error.

As can be seen, the general actions are to return cached, unexpired data when such data exists in response to a request. If cached, unexpired data is not present at a front-end service, then an attempt to obtain the requested data from a data service (e.g., a back-end service) is made. If the attempt is successful, the requested data is returned. If the requested data is unavailable (e.g., the attempt fails because of an error or is taking too long), when present expired data may be repurposed and returned in a response. Thus, returning an error message often can be avoided. An emergency mode may be provided in which data is returned from a cache when such data exists, whether expired or not, otherwise an error message is returned.

One or more aspects are directed towards receiving a client request for client-requested data, and accessing a cache set to attempt to locate the client-requested data. If the data is in the cache set and is not expired data, the data is returned from the cache set in response to the client request. If the data is in the cache set and is expired data, the expired data is maintained and the data is requested from a data provider. If the requested data is available from the data provider, the data is received from the data provider and is returned in response to the client request. If the data is not available from the data provider, the expired data is returned in response to the client request.

When the data is not in the cache set, the data is requested from the data provider, the data is determined to be not available from the data provider, an error response may be returned in response to the client request. When the data is in the cache set and is expired, the data may be determined to be not available from the data by receiving an error response from the data provider, or by reaching a timeout expiration time without the requested data having been returned by the data provider. When the data is in the cache set and is expired, and the data corresponds to a plurality of data items, the data may be determined to be not available from the data provider based upon reaching a timeout expiration time without having received each data item of the plurality of data items within the timeout expiration time. When the data is in the cache set and is expired, and the data corresponds to a plurality of data items, the data may be determined to be not available from the data provider based upon receiving an error message in response to a request for any of the plurality of data items.

Requesting the data from the data provider may include communicating a request from a front-end service that includes the cache set to a back end data service comprising the data provider. Expired data from the back-end data service (comprising the data provider) may be received in response to the request from the front-end data service to the back-end data service; the expired data received at the front-end data service may be returned in response to the client request.

Requesting the data from the data provider may include communicating a request from a back-end service that includes the cache set to at least one backing data source comprising the data provider One or more aspects are directed towards a front-end data service that is coupled to communicate with a back-end data service, and is also coupled to communicate with client requesters, including to receive a client request for data. The front-end data service includes a front-end cache set that is accessed for the request to determine if cached data exists in the front-end cache set to use in a response to the client request for data. If cached data exists in the front-end cache set and the cached data is not expired, the front-end data service uses the data from the front-end cache set in the response to the client request for data. If cached data does not exist in the front-end cache set, the front-end data makes a front-end service request for the data to the back-end data service, and if data is returned from the back-end data service in a back-end response to the front-end service request, the front-end data service uses the data returned from the back-end data service in the response to the client request for data. If cached data exists in the front-end cache set, and the cached data is expired cached data, the front-end data service makes a front-end service request for the data to the back-end data service, and if the data is not available from the back-end data service, the front-end data service uses the expired cached data from the front-end cache set in response to the client request for data.

If cached data does not exist in the front-end cache set, and the data is not available from the back-end data service, the front-end service may return an error in response to the client request.

The front-end cache set may include a single cache, or at least two caches in a tiered cache configuration.

The back-end data service may include a back-end cache set, and when data is requested from the back-end data service by the front-end data service, the back-end data service may determine if cached data for the front-end service request exists in the back-end cache set; if cached data exists in the back-end cache set, and the cached data is not expired, the back-end data service uses the data from the back-end cache set in a response to the front-end service request. If cached data does not exist in the back-end cache set, the back-end data service communicates with one or more backing data sources to make one or back-end service requests for the data to the one or more backing data sources; if the data is returned from the one or more backing data sources in one or more responses to the one or more back-end service requests, the back-end data service uses the data in a response to the front-end service request. If cached data exists in the back-end cache set and is expired, the back-end data service communicates with one or more backing data sources to make one or back-end service requests for the data to the one or more backing data sources; if the data is not available from the one or more backing data sources, the back-end data service uses the expired data in a response to the front-end service request.

The back-end data service may include a back-end cache set, and the back-end data service may operate in an emergency mode. When data is requested from the back-end data service by the front-end data service, the back-end data service may determine if cached data for the front-end service request exists in the back-end cache set; if cached data exists in the back-end cache set, the back-end data service may use the data from the back-end cache set in a response to the front-end service request independent of whether the data in the back-end cache set is expired or not expired.

The front-end data service may include a batch manager that batches requests to the back-end data service. The front-end data service may include a request multiplexer that multiplexes requests to the back-end data service and demultiplexes responses from the back-end data service.

One or more aspects are directed towards receiving a client request for data at a front-end data service, and accessing a front-end cache set to attempt to obtain the data. If obtained from the front-end cache set, a determination is made as to whether the data is expired; if not expired, the data is used in a response to the client. If expired, the expired data is maintained, and an attempt is made to obtain the data by communicating with a back-end data service; if the data is available from the back-end data service, the data is used in a response to the client. If the data is not available from the back-end data service, and expired data is maintained the expired data is used in a response to the client. If the data is not available from the back-end data service and no expired data is maintained, an error message is provided in a response to the client.

The determination may be made that the data is not available from the back-end data service by reaching a timeout time before the back-end data service has returned the data or by receiving an error message from the back-end data service. The data requested from the back-end data service may include a plurality of sub-requests, and determining that the data is not available from the back-end data service may include reaching a timeout time before the back-end data service has returned a data item response for each sub-request, or may include receiving an error message from the back-end data service for any sub-request.

Communicating with the back-end data service to attempt to obtain the data may include sending a front-end data service request to the back-end data service and receiving the front-end data service request for data at the back-end data service. A back-end cache set to may be accessed to attempt to obtain the data, and if obtained from the back-end cache set and if not expired, the data may be used in a back-end response to the front-end data service request. If expired, the expired data may be maintained. One or more backing data sources may be communicated with to attempt to obtain the data, and if the data is available from the one or more backing data sources, the data may be used in a back-end response to the front-end data service. If the data is not available from the front-end data service request and expired data is maintained, the expired data may be used in a back-end response to the front-end data service request. If the data is not available from the one or more backing data sources and no expired data is maintained, an error message may be provided in a back-end response to the front-end data service request.

Communicating with the back-end data service to attempt to obtain the data may include sending a front-end data service request to the back-end data service. The back-end data service may be operated in an emergency mode, including receiving the front-end data service request for data at the back-end data service, accessing a back-end cache set to attempt to obtain the data, and if obtained from the back-end cache set, returning the data from the back-end cache set in response to the front-end data service request. If not obtained from the back-end cache set, an error message may be returned in response to the front-end data service request.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
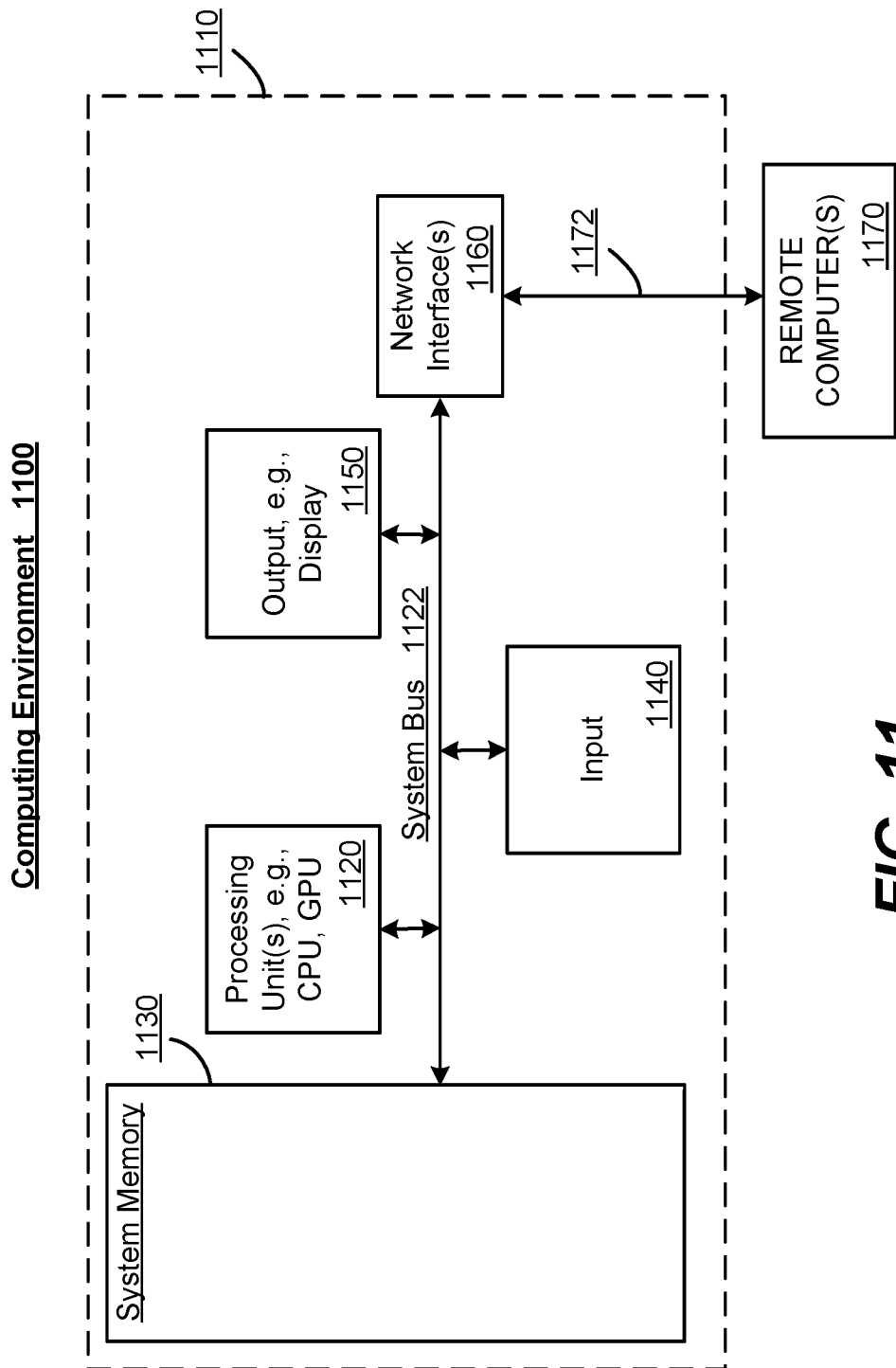
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
  a processor; and
  a memory that stores executable instructions that, when executed by the processor, facilitate performance of operations, the operations comprising:
    receiving a client request for a data item, and in response to the client request:
      accessing a cache set to attempt to locate a cache entry corresponding to the data item;
      in response to locating an unexpired cache entry corresponding to the data item, returning the data item, corresponding to the unexpired cache entry, from the cache set in response to the client request; and
      in response to locating an expired cache entry corresponding to the data item, maintaining the expired cache entry and requesting the data item from a data provider, wherein
in response to the requested data item being returned by the data provider, returning the data item from the data provider in response to the client request, and
in response to indication of operation of an emergency mode related to the cache set or the data provider and the requested data item not being returned, returning data comprising the expired cache entry.

2. The system of claim 1, wherein the data item corresponds to an expired entry in the cache set, and wherein the data item is not returned by the data provider within a timeout time.

3. The system of claim 1, wherein the data item corresponds to an expired entry in the cache set, wherein the data item is not returned by the data provider, and wherein the operations further comprise, returning an error response in conjunction with returning the data comprising the expired cache entry, in response to the client request.

4. The system of claim 1, wherein the data item corresponds to an expired entry in the cache set, wherein the data item is not returned by the data provider, and wherein the operations further comprise receiving an error response from the data provider.

5. The system of claim 1, wherein requesting the data from the data provider comprises communicating a request from a front-end service that includes the cache set to a back-end data service comprising the data provider.

6. The system of claim 5, wherein the operations further comprise, receiving an expired data item from the back-end data service, and returning the expired data item in response to the client request.

7. The system of claim 1, wherein the data item corresponds to an expired entry in the cache set, wherein the data item is returned as an unexpired data item by the data provider, and wherein the operations further comprise updating the cache set with the unexpired data item returned by the data provider.

8. The system of claim 1, wherein the data item is not located in the cache set, and wherein the operations further comprise requesting the data item from a data provider, and in response to the requested data item being returned by the data provider, returning the data item from the data provider in response to the client request, and in response to the requested data item not being returned by the data provider, returning an error, in conjunction with returning the data comprising the expired cache entry, in response to the client request.

9. The system of claim 1, wherein the operations further comprise indicating a back-end data service comprising the data provider as operating in the emergency mode comprising a non-responsive state.

10. The system of claim 1, wherein the operations further comprise indicating a front-end data service comprising the cache set as operating in the emergency mode due to inability to communicate with a back-end data service comprising the data provider.

11. A system, comprising:
a processor; and
a memory that stores executable instructions that, when executed by the processor, facilitate performance of operations, the operations comprising:
receiving, at a server, a client request for data;
determining whether the data exists as cached data in a cache set coupled to the server; and
in response to determining that the data exists as cached data in the cache set and the cached data is not expired, returning the cached data from the cache set in response to the client request for data;
in response to determining that the data does not exist as cached data in the cache set, requesting the data from a data service, and if the data is returned from the data service, returning the data returned from the data service in response to the client request for data; and
in response to determining that the data exists as cached data and the cached data is expired cached data, requesting the data from the data service, and
in response to a front-end data service comprising the cache set or a back-end data service comprising the data service being in a non-responsive state, returning data comprising the expired cached data in response to the client request for data.

12. The system of claim 11, wherein the cache set comprises a single cache, or wherein the cache set comprises at least two caches in a tiered cache configuration.

13. The system of claim 11, wherein the cache set comprises a local cache of the server, and a distributed cache coupled to the server and at least one other server.

14. The system of claim 13 wherein the back-end data service is coupled to a back-end cache set, and wherein when the data is requested from the back-end data service by the front-end data retrieval service, the back-end data service determines if back-end cached data for the front-end service request exists in the back-end cache set, and
if back-end cached data exists in the back-end cache set, and the cached data is not expired, the back-end data service uses the back-end cached data from the back-end cache set in a response to the front-end service request;
if back-end cached data does not exist in the back-end cache set, the back-end data service communicates with one or more backing data sources to make one or back-end service requests for the data to the one or more backing data sources, and if the data is returned from the one or more backing data sources in one or more responses to the one or more back-end service requests, the back-end data service uses the data in a response to the front-end service request; or
if back-end cached data cached data exists in the back-end cache set and is expired, the back-end data service communicates with one or more backing data sources to make one or back-end service requests for the data to the one or more backing data sources, and if the data is not available from the one or more backing data sources, the back-end data service uses the expired back-end cached data in a response to the front-end service request.

15. The system of claim 11, wherein the operations further comprise indicating operation of an emergency mode in response to receipt of a plurality of error messages from a back-end data service comprising the data service.

16. A non-transitory machine-readable medium, comprising executable instructions that, when executed by a processor, facilitate performance of operations, the operations comprising:
receiving a client request for data at a front-end data service;
accessing a front-end cache set to attempt to obtain the data;

if the data is obtained from the front-end cache set, determining whether the data is expired, and
if the data is not expired, using the data in a response to the client request, and
if the data is expired, maintaining the expired data, communicating with a back-end data service to attempt to obtain the data, and if the data is returned from the back-end data service, using the data in a response to the client request, and if the data is not available from the back-end data service, returning data comprising the expired data in a response to the client request, and
if the data is not obtained from the front end cache set, communicating with a back-end data service to attempt to obtain the data, and if the data is returned from the back-end data service, using the data in a response to the client request, and if the data is not returned from the back-end data service and the back-end data service is in a non-responsive state, providing an error message and the expired data in a response to the client request.

17. The non-transitory machine-readable medium of claim 16, wherein the operations further comprise, at the back end data service, receiving a communication from the front-end data service attempting to obtain the data, accessing a back-end cache set to attempt to obtain the data, and
if obtained from the back-end cache set, determining whether the data is expired, and
if not expired, using the data in a back-end response to the front-end data service communication, and
if expired, communicating with one or more backing data sources to attempt to obtain the data, and
if the data is returned by the one or more backing data sources, using the data in a back-end response to the front-end data service communication, and
if the data is not returned by the one or more backing data sources, using the expired data in a back-end response to the front-end data service communication; and
if not obtained from the back-end cache set, communicating with one or more backing data sources to attempt to obtain the data, and if the data is returned by the one or more backing data sources, using the data in a back-end response to the front-end data service communication, and if the data is not returned by the one or more backing data sources, providing an error message in a back-end response to the front-end data service request.

18. The non-transitory machine-readable medium of claim 16, wherein the operations further comprise determining that the data is not returned from the back-end data service, comprising reaching a timeout time before the back-end data service has returned the data, or receiving an error message from the back-end data service.

19. The non-transitory machine-readable medium of claim 16, wherein the data is obtained from the front-end cache set, wherein the data is expired, wherein the data is returned from the back-end data service to the front-end data service, and wherein the operations further comprise updating the front-end cache set with the data returned from the back end data service.

20. The non-transitory machine-readable medium of claim 16, wherein the operations further comprise indicating operation of an emergency mode of the back-end data service in response to receipt of a plurality of error messages from the back-end data service.

* * * * *